US 8,296,196 B2

Oct. 23, 2012

(12) United States Patent
Martine et al.

(10) Patent No.: US 8,296,196 B2
(45) Date of Patent: Oct. 23, 2012

(54) TAG ALONG SHOPPING

(75) Inventors: Michael J. Martine, Chapel Hill, NC (US); Steven M. Harrison, Bremerton, WA (US); Michael Rowe, Durham, NC (US)

(73) Assignee: International Business Machines Corporation, Armonk, NY (US)

( * ) Notice: Subject to any disclaimer, the term of this patent is extended or adjusted under 35 U.S.C. 154(b) by 455 days.

(21) Appl. No.: 12/120,667

(22) Filed: May 15, 2008

(65) Prior Publication Data

US 2009/0287728 A1    Nov. 19, 2009

(51) Int. Cl.
*G06Q 30/00* (2012.01)
*G06F 3/048* (2006.01)
*G06F 7/00* (2006.01)
*G06F 17/30* (2006.01)

(52) U.S. Cl. ............ 705/27.2; 705/26.1; 705/26.7; 705/27.1; 715/810; 707/749

(58) Field of Classification Search ............ 705/26.1, 705/26.7, 27.1, 27.2; 715/810; 707/749
See application file for complete search history.

(56) References Cited

U.S. PATENT DOCUMENTS

| | | | | |
|---|---|---|---|---|
| 6,014,638 | A * | 1/2000 | Burge et al. .............. | 705/7.29 |
| 6,032,129 | A * | 2/2000 | Greef et al. .............. | 705/26.43 |
| 6,381,583 | B1 * | 4/2002 | Kenney .................... | 705/26.8 |
| 6,901,379 | B1 * | 5/2005 | Balter et al. ............. | 705/27.2 |
| 7,219,072 | B1 | 5/2007 | Sundaresan | |
| 7,529,690 | B2 * | 5/2009 | Hadi ........................ | 705/26 |
| 7,729,951 | B2 * | 6/2010 | Dawson et al. .......... | 705/26 |
| 8,165,924 | B2 * | 4/2012 | Smyers et al. ........... | 705/26.62 |
| 2001/0044751 | A1 * | 11/2001 | Pugliese et al. .......... | 705/26 |
| 2002/0152127 | A1 * | 10/2002 | Hamilton et al. ........ | 705/26 |
| 2002/0178072 | A1 | 11/2002 | Gusler et al. | |
| 2003/0004774 | A1 | 1/2003 | Greene et al. | |
| 2005/0044005 | A1 | 2/2005 | Giannini | |
| 2005/0131776 | A1 * | 6/2005 | Perotti et al. ............ | 705/27 |
| 2005/0177463 | A1 * | 8/2005 | Crutchfield et al. ..... | 705/27 |

(Continued)

OTHER PUBLICATIONS

Pallavi Srivastava. (Oct. 2007). Internet's 10 Best Shop; Online buying has come a long way. Virtual assistants and celebrity recos are just some of the cool new features. Pallavi Srivastava trawled the internet to shortlist the 10 best online stores. Business Today,194. Retrieved Jun. 8, 2012, from ABI/INFORM Global. (Document ID: 1360219851.*

(Continued)

*Primary Examiner* — Scott Zare
(74) *Attorney, Agent, or Firm* — Scully, Scott, Murphy & Presser, P.C.; William Stock, Esq.

(57) ABSTRACT

A method for browsing in a virtual environment includes generating a plurality of tag data collections from multiple tag data sources. A plurality of virtual online browsing modes are presented using a computer having data storage. A browsing mode is selected by a user, wherein the browsing mode specified includes tag data and preference data. The tag data collection is analyzed for tag data associated with the browsing mode data. At least one specified tag collection from the plurality of tag collections is generated using the selected browsing mode. Associated tag data is determined from the specified tag collection and a user's tag data. A tag data group is generated from the tag data collection analysis using the tag sets, and a three-dimensional virtual environment is generated and presented on the computer using the tag data group, which may present the user with a plurality of goods and/or services.

17 Claims, 2 Drawing Sheets

U.S. PATENT DOCUMENTS

| | | |
|---|---|---|
| 2007/0020606 A1 | 1/2007 | Knight |
| 2007/0100705 A1 | 5/2007 | Chen |
| 2007/0101276 A1* | 5/2007 | Yuen .............................. 715/757 |
| 2008/0195507 A1* | 8/2008 | Ratnakar .......................... 705/27 |
| 2008/0208715 A1* | 8/2008 | Hod et al. ........................ 705/27 |
| 2009/0037291 A1* | 2/2009 | Dawson et al. ................. 705/27 |
| 2010/0070378 A1* | 3/2010 | Trotman et al. ................. 705/26 |

OTHER PUBLICATIONS

Landsend.com Sets Virtual Fashion Trend. Dec. 2000. Response, v 9 , n. 3 , p. 94.*

GreyStone Announces VirtUal-Info-Space (TM) Platform for the Interent; E-Business, Users Empowered to Create Personalized Digital Worlds. Oct. 21, 2000. PR Newswire.*

* cited by examiner

TAG ALONG SHOPPING

FIELD OF THE INVENTION

The present invention relates to a method for browsing in a virtual environment, and more specifically, includes using a plurality of tag data collections to generate a virtual environment for browsing.

BACKGROUND OF THE INVENTION

Virtual environments on a computer typically may include a gaming experience or an Internet shopping experience. For example, such experiences may include a user playing a game against the computer, or with another local user, or with user anywhere in the world using a network, e.g., the Internet. These virtual experiences provide a realistic scenario for games and consumers. Consumers may use computers for shopping via electronic commerce (e-commerce). For example, e-commerce web sites offer virtual shopping carts. A buyer adds items to be purchased to the shopping cart while continuing to shop, and then proceeds to check out as desired.

Known are products for identification of shopping buddies for bringing people together for a chat session or co-browsing. For example, a user may be provided with an opportunity to co-browse with other shoppers. The user may be provided an option to inquire about other shoppers browsing for the same product in the virtual store. Other options may include allowing other shoppers in a virtual store to be aware of another users browsing presence in the virtual store so that a communication can be initiated between the users. However, while typical co-browsing experiences allow for contact between two or more users, or seeing what another user is viewing, a virtual experience commingling or combining the user's browsing history or experience or the user's preferences with another's browsing history is lacking.

Therefore, a need exists for a method and computer program product for providing a virtual environment derived from combining a user's preferences and/or browsing history with one or more users, specified persons or specified event options, to generate a virtual environment.

SUMMARY OF THE INVENTION

In an aspect of the invention, a method for browsing in a virtual environment includes deriving at least one tag data collection from at least one tag data source; presenting a plurality of virtual online browsing modes using a computer having data storage; selecting a browsing mode which specifies browsing mode data; analyzing the tag data collection for tag data associated with the browsing mode data; generating an overlapping tag data group from the tag data collection analysis; and presenting a three-dimensional virtual environment on the computer using the overlapping tag data group. In a related aspect, the method further includes deriving a plurality of tag data collections from a multiplicity of tag data sources. In another related aspect, the browsing mode data includes shopping tags and the three-dimensional virtual environment includes items for sale. The browsing mode data may also include a plurality of selected tag data collections and the three-dimensional virtual environment may include items for sale.

In a related aspect, the method further includes: generating a plurality of tag data collections from multiple tag data sources including a user's tag data collection from a user's tag data source; analyzing the plurality of tag data collections further including: generating user tag data from the user's tag data collection associated with the selected browsing mode; determining at least one specified tag collection from the plurality of tag collections using the selected browsing mode; determining associated tag data between the specified tag collection and the user tag data; and wherein generating the overlapping tag data group includes using the overlapping tags. The browsing modes may include a selected person browsing mode wherein the user selects the tag data collection of a specified person included in the browsing mode data, and the user follows in the three dimensional virtual environment the overlapping tag data group generated from the user's tag data and the browsing mode data. Further, the browsing modes may include an event browsing mode wherein the user selects the tag data collection of a specified event included in the browsing mode data, and the user follows in the three dimensional virtual environment the overlapping tag data group generated from the user's tag data and the browsing mode data. Additionally, the browsing mode may include a ghost browsing mode wherein the user selects the tag data collection of a specified person included in the browsing mode data, and the user follows in the three dimensional virtual environment the browsing mode data. Further, the browsing mode may include a golem browsing mode wherein the user selects the tag data collection of a specified person included in the browsing mode data, and the user follows in the three dimensional virtual environment the overlapping tag data group generated from the user's tag data and the browsing mode data. The browsing mode may include a customized browsing mode wherein the user selects the tag data collection of a product database included in the browsing mode data, and the user follows in the three dimensional virtual environment the overlapping tag data group generated from the user's tag data and the browsing mode data.

In a related aspect, the method includes a plurality of browsing modes including a customized browsing mode, and the method further includes: selecting at least one tag collection to associate with the user tag data collection; and selecting set logic for analyzing the tag data collections for generating the overlapping tag data group to generate the three dimensional virtual environment.

In another aspect, a computer program product comprises a computer readable medium having recorded thereon a computer program for enabling a processor in a computer system for browsing in a virtual environment, the computer program performing the steps of: generating a plurality of tag data collections from multiple tag data sources including a user's tag data collection from a user's tag data source; presenting a plurality of virtual online browsing modes using a computer having data storage; selecting a browsing mode which specifies browsing mode data; analyzing the tag data collection for tag data associated with the browsing mode data; generating user tag data from the user's tag data collection associated with the selected browsing mode; determining at least one specified tag collection from the plurality of tag collections using the selected browsing mode; determining associated tag data between the specified tag collection and the user tag data; generating an overlapping tag data group from the tag data collection analysis using the overlapping tags; and presenting a three-dimensional virtual environment on the computer using the overlapping tag data group.

In a related aspect, the computer program product further includes: deriving automatically a plurality of tag data collections from a multiplicity of tag data sources.

In a related aspect, the computer program, further includes: generating a plurality of tag data collections from multiple tag data sources including a user's tag data collection from a user's tag data source; analyzing the plurality of tag data collections further including: generating user tag data from the user's tag data collection associated with the selected browsing mode; determining at least one specified tag collection from the plurality of tag collections using the selected browsing mode; determining associated tag data between the specified tag collection and the user tag data; and wherein generating the overlapping tag data group includes using the overlapping tags.

In a related aspect, a plurality of browsing modes include a customized browsing mode, and the method further includes: selecting at least one tag collection to associate with the user tag data collection; and selecting set logic for analyzing the tag data collections for generating the overlapping tag data group to generate the three dimensional virtual environment. This aspect allows for a customized 3D Internet store, museum or other such place to be dynamically generated and populated with items of interest to the user of this browsing mode based on the matches to the tag set.

In a related aspect, the program generates a selected person browsing mode wherein the user selects the tag data collection of a specified person included in the browsing mode data, and the user follows in the three dimensional virtual environment the overlapping tag data group generated from the user's tag data and the browsing mode data.

In a related aspect, the program generates an event browsing mode wherein the user selects the tag data collection of a specified event included in the browsing mode data, and the user follows in the three dimensional virtual environment the overlapping tag data group generated from the user's tag data and the browsing mode data.

In a related aspect, the program generates a ghost browsing mode wherein the user selects the tag data collection of a specified person included in the browsing mode data, and the user follows in the three dimensional virtual environment the browsing mode data.

In a related aspect, the program generates a golem browsing mode wherein the user selects the tag data collection of a specified person included in the browsing mode data, and the user follows in the three dimensional virtual environment the overlapping tag data group generated from the user's tag data and the browsing mode data.

In a related aspect, the program generates a customized browsing mode wherein the user selects the tag data collection of a product database included in the browsing mode data, and the user follows in the three dimensional virtual environment the overlapping tag data group generated from the user's tag data and the browsing mode data.

BRIEF DESCRIPTION OF THE DRAWINGS

These and other objects, features and advantages of the present invention will become apparent from the following detailed description of illustrative embodiments thereof, which is to be read in connection with the accompanying drawings, in which.

DETAILED DESCRIPTION OF THE INVENTION

Figure 1:
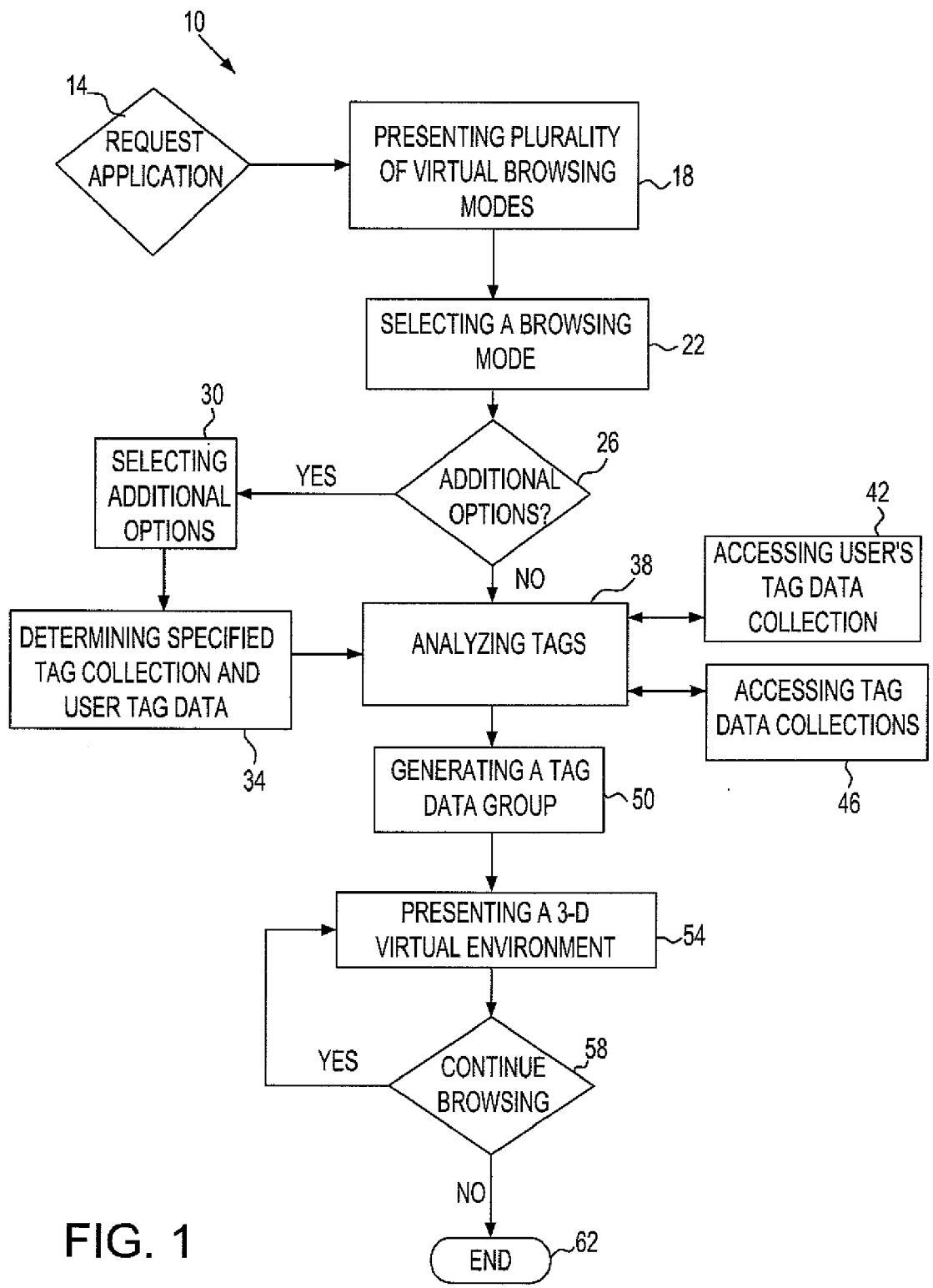
FIG. 1 is a low chart depicting a method for providing a virtual environment according to an embodiment of the invention.
Figure 2:
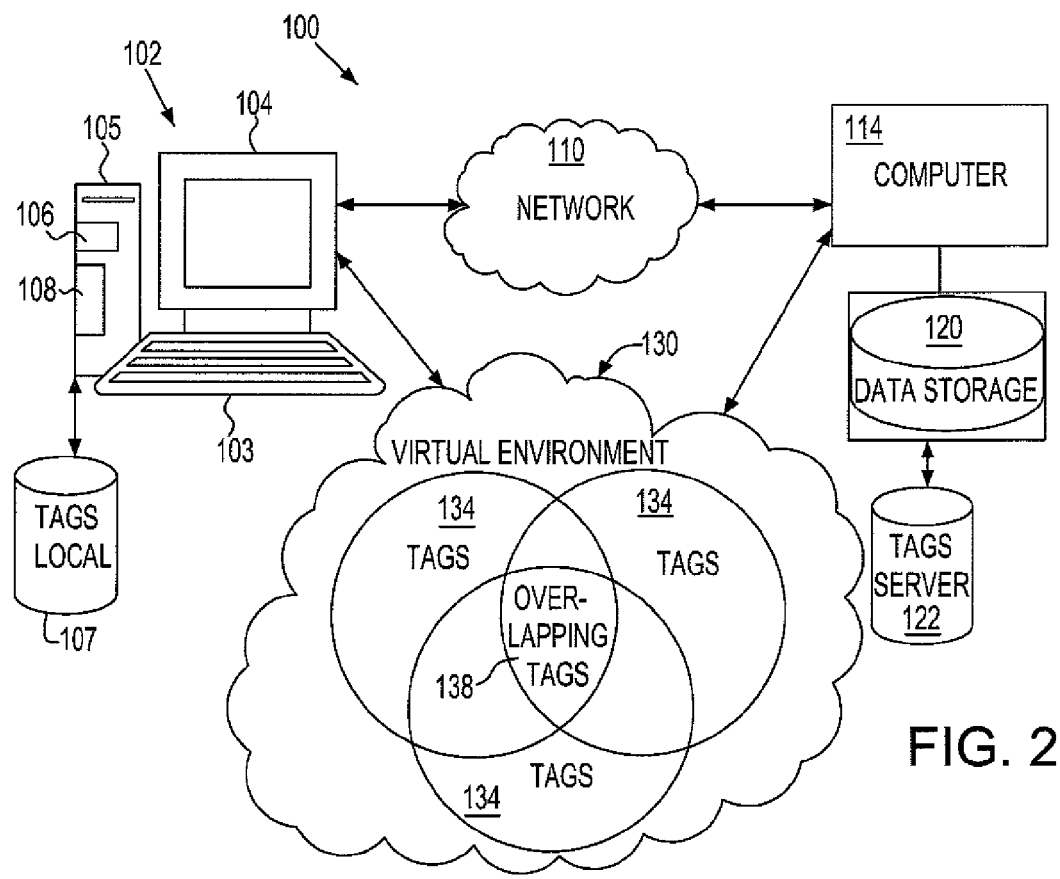
FIG. 2 is a block diagram according to the invention of an embodiment of a system for supporting the method shown in FIG. 1.

An illustrative embodiment of a method 10 for browsing in a virtual environment or space, according to the present invention is shown in FIG. 1 and a system 100 for browsing in the virtual environment 130 is shown in FIG. 2. In the exemplary embodiment, referring to FIGS. 1 and 2, a computer system 102 is used for accessing a network 110 which may be the Internet or a local or wide area network. The network 110 communicates with a computer 114 having data storage 120 which may include a tags server 122. The tags server 122 may include, for example, tag data collections and/or tags particular to a user. Alternatively, the user tags may be stored locally, e.g., in a data storage device 107 local to the computer system 104. The tags may include, but are not limited to, for example, past purchases, social tags, interests, such as user self selected tags, browsing experiences (i.e., cookies or tracking), copied tags including shared tags from other people. Each user has the ability to enable or disable specific tags or tag sources, as well as, the ability to include tags from other sources, e.g., stored tags from previous shopping experiences. The tags may also be derived from multiple sources including, an online photo management and sharing application such as flickr® for sharing photosets, or radio frequency identification (RFID) embedding in clothing worn by a person having the browsing experience in the 3D internet space.

In operation, referring to FIGS. 1 and 2, a user at the computer system 102 requests an application for browsing in a virtual environment 130 according to the present invention, as in step 14 in the flow chart of FIG. 1. The application is stored in computer readable medium 108 and read by a processor 106 in the computer 105 of the computer system 102. The computer system 102 further includes a screen 104 and keyboard 103. The user is then presented with a plurality of virtual browsing modes, as in step 18. The user selects a browsing mode in step 22 which specifies browsing mode data, including tags stored in data storage 120 or the tags server 122, and user preferences/options. The tags for the browsing modes are generated from one or more tag data collections stored in data storage 120, tags server 122 or locally 107, and derived from multiple tag data sources. The virtual environment 130 is thus derived from ascertaining overlapping tags 138 from various tag data collections 134. The overlapping tags 138 show in the exemplary embodiment of FIG. 2, is one embodiment of a tag data group. The tag data group may be derived using numerous variations of set logic or set theory.

The tag data sources include, for example, persons of interest, e.g., celebrities, or experts in a field, other users of the browsing application may also have tag collections from particular tag data sources. Further, a user's tag data collection derived from one or more of the user's tag data sources may be used to provide user tag data, as in step 34. The browsing modes may include, a selected person browsing mode, for example, a celebrity, and thus the user is selecting a tag data collection for the selected person. The tag data collection is stored in the data storage 120 or the tags server 122 (FIG. 2) as well as any other pertinent data such as images, facts of interest, shopping data, etc., used to create the virtual experience using the specified event's tag data.

The browsing modes may also include an event browsing mode wherein the user selects the tag data collection of a specified event and the user's three dimensional virtual environment includes the specified event's tag data. Examples of events include, but are not limited to, a holiday, social gathering (e.g., South by Southwest festival, NCAA Final Four basketball tournament, etc.), or a sale from a retailer and the like.

Further, for example, the browsing mode may include a ghost browsing mode wherein the user selects the tag data collection of a specified person and the user's three dimensional virtual environment includes the specified person's tag data. The browsing modes may also include, for example, a golem browsing mode wherein the user selects the tag data collection of a specified person and follows in the three dimensional virtual environment the overlapping tag data group generated from the user's tag data and the specified person's tag data.

Additionally, for example, the browsing modes may include a customized browsing mode wherein the user selects the tag data collection of a product database and the user follows in the three dimensional virtual environment the overlapping tag data group generated from the user's tag data and the product database tag data. Therefore, the three dimensional virtual environment is dynamically generated and configured for the user, for example, the store will be customized to show/offer its goods and services that the user will most likely to want to shop for and buy based on the tag collections described above in the browsing modes. For example, if a user enters an electronics store shopping for a specific item, the virtual experience includes presenting those items as the user enters the store. In an alternative example, a shopping experience may include a store customized around a theme or person. For example, a shopping experience may be created with a theme from a specified decade or period of time, e.g., the 1980's or Victorian England, and as such will have products such as clothing and accessories that are personalized to the shopper.

The user may choose to select additional options in step 26, such as, a particular celebrity, product search, shopping location, particular exhibit or museum, etc., in step 30. Once the user selects additional options, the application determines one or more tag collections to access in step 34 and proceeds to access and analyze the tags necessary for the selected browsing mode in step 38. The tag data collections may be stored locally 107 or remotely in data storage 120 or on a designated tags server 122. The step of analyzing the tags 38 in the tag collections may include accessing the user tag data collection(s) in step 42 and/or accessing one or more tag data collections in step 46. In step 50, the application determines associated tag data between specified tag collections, which may include, for example, a tag collection and data parameters such as a selected person and a selected product, and/or the user's tag data collection and a selected tag data collection. The application generates an overlapping tag data group from the associated tag data in step 50. The overlapping tag data group is used to generate and present a three dimensional virtual environment to the user, allowing the user to follow in the three dimensional virtual environment the generated overlapping tag data group. The user can thereafter select in step 58 to end the application 62.

In one embodiment of the invention, the browsing mode may include shopping tags of another user, celebrity, or other selected person. The user can thus tag-along with a selected shopper in the virtual environment, or follow in the virtual environment created from the overlapping tags of the user and the selected person. Alternatively, the user can have a collaborative shopping experience where both the user's tag data and another user's tag data is used to shop together by determining overlapping tags, in real time, and thus the shopping virtual environment will dynamically change the shopping experience to provide targeted products based on common preferences. Thus, the user may be presented with a three dimensional virtual environment, for example, for shopping or following another's browsing experience, e.g., a buying experience such as purchasing a car, or a persons experience browsing a collection such as found in a museum.

One advantage of the present invention is that the user is able to target their browsing, e.g., shopping, experience using overlapping tags selected using any number of preferences or options, for example, a person, or a product. Additionally, another advantage is advertising may be better targeted to users by aiming advertising for a product or service to the users with relevant tag data in a virtual experience.

The method of the present invention may also include providing a plurality of browsing modes including one or more customized browsing modes. The custom browsing mode includes the user customizing the browsing mode by selecting one or more tag collections to associate with the user tag data collection. The custom browsing mode additionally includes the user selecting set logic (using set theory) for analyzing the tag data collections for generating the tag data group. The invention generates the three dimensional virtual environment using the tag data group as in the previous embodiments. It is understood that set logic includes, for example, unions, intersections, complements, Cartesian products and all manner of set logic. Thus, the set logic may include, for example, associating complements of tags between a user and a selected person or multiple persons, or subtracting the tags of a selected person to generate the tag data group. Further, set logic may be used to create a tag data group of the user's tags not in common or not overlapping with a specified person or other tag data collection.

Figure 3:
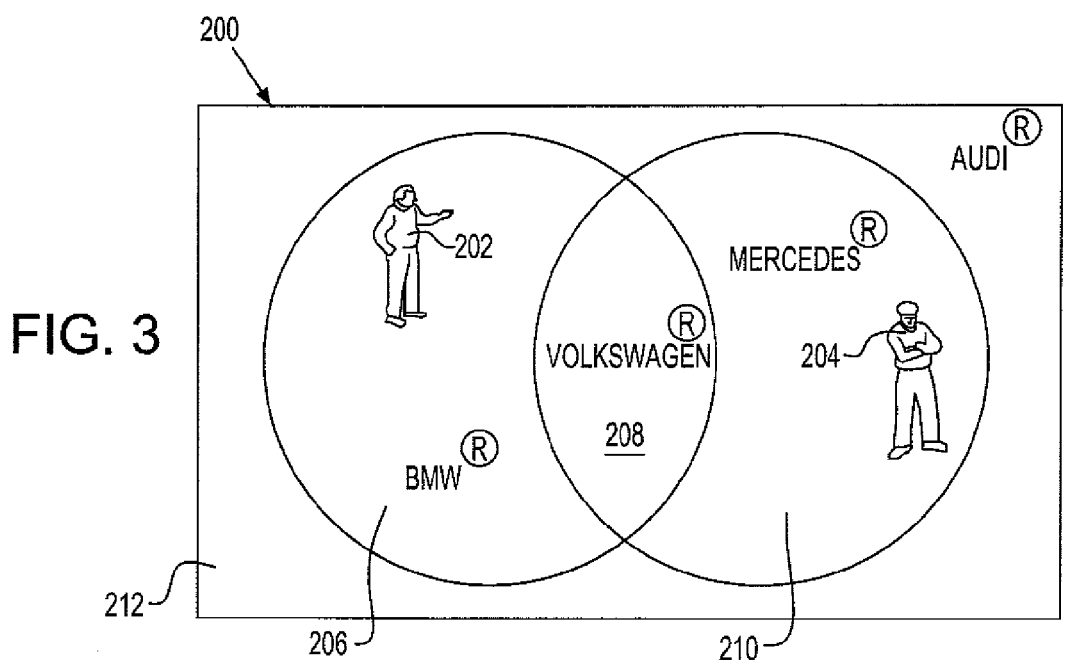
FIG. 3 is a block diagram according to the invention of an embodiment of a set of preferences for users.

Referring to FIG. 3, an alternative embodiment according to the present invention of a browsing mode tag collection 200 using set logic includes two users and their motor vehicle preferences which each have associated tags. A user or first person 202 prefers BMW® 206 and Volkswagen® 208 brand cars, and a user or second person 204 prefers Mercedes® 210 and Volkswagen® 208 brand cars. The first and second persons 202, 204, respectively, want to have a shopping experience where they exclude all tags that they have in common or overlapping, to result in a new shopping experience for products they would have not considered together. Thus, subtracting the combined tags of the first and second person 202, 204, respectively, from all the tags results in Audi® 212 vehicles because neither the first or second persons 202, 204, respectively, tagged Audi®, i.e., mathematically U\(A+B)=C, wherein the result is not the union of the overlapping set of A (BMW® & Volkswagen®) and B (Mercedes® & Volkswagen®), but is C, Audi®. Thus, all types of set logic are available to the user via the browsing modes of the tag along shopping/browsing method of the present invention.

While the present invention has been particularly shown and described with respect to preferred embodiments thereof, it will be understood by those skilled in the art that changes in forms and details may be made without departing from the spirit and scope of the present application. It is therefore intended that the present invention not be limited to the exact forms and details described and illustrated herein, but falls within the scope of the appended claims.

What is claimed is:

1. A method for browsing in a virtual environment, comprising:
   executing computer readable instructions using a processor of a computer, the computer readable instructions including the following steps:
   deriving at least one tag data collection from at least one tag data source, tag data including data for a user's preference, and factual data about a person, place or thing;
   presenting a plurality of virtual online browsing modes using the computer having data storage;

selecting, using the processor, a browsing mode from a plurality of browsing modes which includes a customized browsing mode, the browsing mode specifies browsing mode data;

analyzing, using the processor, the tag data collection for tag data associated with the browsing mode data;

generating, using the processor, a tag data group from the tag data collection analysis;

presenting a virtual environment on a display of the computer using the tag data group;

selecting at least one tag collection to associate with the user tag data collection; and selecting set logic for analyzing the tag data collections for generating the tag data group to generate the virtual environment, the set logic including defining how tag data collections are compared to each other;

wherein the browsing modes include an event browsing mode wherein the user selects the tag data collection of a specified event included in the browsing mode data, and the user follows in the virtual environment the overlapping tag data group generated from the user's tag data and the browsing mode data, wherein the tag data collection of a specified event does not include a person's preferences.

2. The method of claim 1, further including:

deriving a plurality of tag data collections from a multiplicity of tag data sources.

3. The method of claim 1, wherein the browsing mode data includes shopping tags and the virtual environment includes items for sale.

4. The method of claim 1, wherein the browsing mode data includes a plurality of selected tag data collections and the virtual environment includes items for sale.

5. The method of claim 1, further including:

generating a plurality of tag data collections from multiple tag data sources including a user's tag data collection from a user's tag data source;

analyzing the plurality of tag data collections which further includes:

generating user tag data from the user's tag data collection associated with the selected browsing mode;

determining at least one specified tag collection from the plurality of tag collections using the selected browsing mode; and determining associated tag data between the specified tag collection and the user tag data; and wherein generating the tag data group includes using overlapping tags.

6. The method of claim 5, wherein the browsing modes include a selected person browsing mode wherein the user selects the tag data collection of a specified person included in the browsing mode data, and the user follows in the virtual environment the overlapping tag data group generated from the user's tag data and the browsing mode data.

7. The method of claim 5, wherein the browsing mode includes a golem browsing mode wherein the user selects the tag data collection of a specified person included in the browsing mode data, and the user follows in the virtual environment the overlapping tag data group generated from the user's tag data and the browsing mode data, such that the ghost browsing mode includes only the tag data collection of the specified person.

8. The method of claim 1, wherein the customized browsing mode includes the user selecting the tag data collection of a product database included in the browsing mode data, and the user follows in the virtual environment the overlapping tag data group generated from the user's tag data and the browsing mode data.

9. A computer program product comprising a non-transitory computer readable medium having recorded thereon a computer program for enabling a processor in a computer system for browsing in a virtual environment, the computer program performing the steps of:

generating a plurality of tag data collections from multiple tag data sources including a user's tag data collection from a user's tag data source;

presenting a plurality of virtual online browsing modes using a computer having data storage, the plurality of virtual online browsing modes include a customized browsing mode;

selecting a browsing mode which specifies browsing mode data;

analyzing the tag data collection for tag data associated with the browsing mode data;

generating user tag data from the user's tag data collection associated with the selected browsing mode;

determining at least one specified tag collection from the plurality of tag collections using the selected browsing mode;

determining associated tag data between the specified tag collection and the user tag data;

generating a tag data group from the tag data collection analysis using the associated tags;

presenting a virtual environment on the computer using the tag data group;

selecting at least one tag collection to associate with the user tag data collection; and selecting set logic for analyzing the tag data collections for generating the tag data group to generate the virtual environment, the set logic including defining how tag data collections are compared to each other;

wherein the browsing modes include an event browsing mode wherein the user selects the tag data collection of a specified event included in the browsing mode data, and the user follows in the virtual environment the overlapping tag data group generated from the user's tag data and the browsing mode data, wherein the tag data collection of a specified event does not include a person's preferences.

10. The computer program product of claim 9, further including:

deriving automatically a plurality of tag data collections from a multiplicity of tag data sources.

11. The computer program product of claim 9, further including:

generating a plurality of tag data collections from multiple tag data sources including a user's tag data collection from a user's tag data source;

analyzing the plurality of tag data collections further including:

generating user tag data from the user's tag data collection associated with the selected browsing mode;

determining at least one specified tag collection from the plurality of tag collections using the selected browsing mode;

determining associated tag data between the specified tag collection and the user tag data; and wherein generating the tag data group includes using overlapping tags.

12. The computer program product of claim 11, wherein the program generates a selected person browsing mode wherein the user selects the tag data collection of a specified person included in the browsing mode data, and the user follows in the virtual environment the tag data group generated from the user's tag data and the browsing mode data.

13. The computer program product of claim 11, wherein the program generates an event browsing mode wherein the user selects the tag data collection of a specified event included in the browsing mode data, and the user follows in the virtual environment the tag data group generated from the user's tag data and the browsing mode data.

14. The computer program product of claim 11, wherein the program generates a ghost browsing mode wherein the user selects the tag data collection of a specified person included in the browsing mode data, and the user follows in the virtual environment the browsing mode data.

15. The computer program product of claim 11, wherein the program generates a golem browsing mode wherein the user selects the tag data collection of a specified person included in the browsing mode data, and the user follows in the virtual environment the tag data group generated from the user's tag data and the browsing mode data.

16. The computer program product of claim 11, wherein the program generates a customized browsing mode wherein the user selects the tag data collection of a product database included in the browsing mode data, and the user follows in the virtual environment the tag data group generated from the user's tag data and the browsing mode data.

17. A method for browsing in a virtual environment, comprising:
   executing computer readable instructions using a processor of a computer, the computer readable instructions including the following steps:
      deriving at least one tag data collection from at least one tag data source, tag data including data for a user's preference, and factual data about a person, place or thing;
      presenting a plurality of virtual online browsing modes using the computer having data storage;
      selecting, using the processor, a browsing mode from a plurality of browsing modes which includes a customized browsing mode, the browsing mode specifies browsing mode data;
      analyzing, using the processor, the tag data collection for tag data associated with the browsing mode data;
      generating, using the processor, a tag data group from the tag data collection analysis;
      presenting a virtual environment on a display of the computer using the tag data group;
      selecting at least one tag collection to associate with the user tag data collection;
      selecting set logic for analyzing the tag data collections for generating the tag data group to generate the virtual environment, the set logic including defining how tag data collections are compared to each other; and
   a first set logic creating the tag data group which includes the user tag data collection not overlapping with the at least one tag collection.

* * * * *